US012287599B2

(12) United States Patent
Mogi et al.

(10) Patent No.: US 12,287,599 B2
(45) Date of Patent: Apr. 29, 2025

(54) STATIC ELIMINATION APPARATUS AND IMAGE FORMING APPARATUS

(71) Applicant: CANON KABUSHIKI KAISHA, Tokyo (JP)

(72) Inventors: Keisuke Mogi, Chiba (JP); Shingo Iwami, Tokyo (JP); Ryo Aihara, Chiba (JP); Taichi Uchida, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/424,616

(22) Filed: Jan. 26, 2024

(65) Prior Publication Data

US 2024/0255885 A1 Aug. 1, 2024

(30) Foreign Application Priority Data

Jan. 30, 2023 (JP) ................................ 2023-011453

(51) Int. Cl.
*G03G 15/00* (2006.01)
*B65H 5/06* (2006.01)

(52) U.S. Cl.
CPC ......... *G03G 15/6573* (2013.01); *B65H 5/064* (2013.01); *B65H 2301/5133* (2013.01)

(58) Field of Classification Search
None
See application file for complete search history.

(56) References Cited

U.S. PATENT DOCUMENTS

2021/0382419 A1* 12/2021 Iwasawa ................ B65H 29/14

FOREIGN PATENT DOCUMENTS

JP 10279122 A * 10/1998
JP 2001302011 A * 10/2001
JP 2021111527 A 8/2021

OTHER PUBLICATIONS

English language abstract of JP 10-279122A to Tanigawa, publication date Oct. 20, 1998. (Year: 1998).*
English language translation of JP 2001-302011A to Tagami, publication date Oct. 31, 2001. (Year: 2001).*

* cited by examiner

*Primary Examiner* — Leslie J Evanisko
(74) *Attorney, Agent, or Firm* — Canon U.S.A., Inc. IP Division

(57) ABSTRACT

A static elimination apparatus includes a conveyance unit to convey a sheet along a conveyance path, a non-contact static elimination unit to eliminate static from the sheet, a first guide member including a contact portion to guide the sheet, and a plurality of openings arranged next to each other in a width direction. The plurality of openings expose the non-contact static elimination unit to a conveyance path. The contact portion includes a plurality of first ribs arranged on one side with respect to a conveyance center, and a plurality of second ribs arranged on the other side with respect to the conveyance center. The plurality of first ribs and the plurality of second ribs are inclined relative to the sheet conveyance direction so that the further downstream in the sheet conveyance direction each rib is, the greater a distance between each rib and the conveyance center is.

7 Claims, 9 Drawing Sheets

STATIC ELIMINATION APPARATUS AND IMAGE FORMING APPARATUS

BACKGROUND

Field

The present disclosure relates to a static elimination apparatus that eliminates static from a sheet, and an image forming apparatus including the same.

Description of the Related Art

In an image forming apparatus such as a copying machine or a facsimile apparatus, a sheet may be charged when an image is formed, and ejected sheets may stick together due to an electrostatic force between the sheets.

Accordingly, an image forming apparatus including a static elimination apparatus that eliminates static from a sheet is discussed. For example, the publication of Japanese Patent Application Laid-Open No. 2021-111527 discusses a static elimination apparatus including a contact static elimination unit (a static elimination roller) that eliminates static in the state where the contact static elimination unit is in contact with a sheet that is to be conveyed, and a non-contact static elimination unit (a discharge wire) that eliminates static in the state where the non-contact static elimination unit is not in contact with the sheet.

In the static elimination apparatus discussed in the publication of Japanese Patent Application Laid-Open No. 2021-111527, the non-contact static elimination unit is placed in a portion of a conveyance path through which the sheet is conveyed. The portion is formed of a guide member (a shielding member) including a plurality of openings. The plurality of openings provided in the guide member exposes the non-contact static elimination unit to the conveyance path, so that the non-contact static elimination unit can eliminate static from the sheet that is to be conveyed.

In a case where a conveyance path is thus formed of a guide member including openings in a non-contact static elimination unit, a corner of the front end of a sheet that is to be conveyed may enter the openings, so that wrinkles may occur in the sheet, and a conveyance failure may occur.

SUMMARY

The present disclosure is directed to providing a static elimination apparatus and an image forming apparatus that are capable of reducing a conveyance failure when a sheet passes through a non-contact static elimination unit.

According to an aspect of the present disclosure, a static elimination apparatus includes a conveyance unit configured to convey a sheet along a conveyance path, a non-contact static elimination unit configured to eliminate static from the sheet in a state where the non-contact static elimination unit is not in contact with the sheet conveyed by the conveyance unit, a first guide member including a contact portion configured to guide the sheet while contacting the sheet conveyed by the conveyance unit, and a plurality of openings arranged next to each other in a width direction of the sheet orthogonal to a sheet conveyance direction and configured to expose the non-contact static elimination unit to the conveyance path, wherein the first guide member serves as a part of the conveyance path, and a second guide member arranged to be opposed to the first guide member and serving as the part of the conveyance path with the first guide member, wherein the contact portion includes a plurality of first ribs arranged on one side with respect to a conveyance center in the sheet width direction, and a plurality of second ribs arranged on the other side with respect to the conveyance center in the sheet width direction, and wherein the plurality of first ribs and the plurality of second ribs are inclined relative to the sheet conveyance direction so that the further downstream in the sheet conveyance direction each rib is, the greater a distance between each rib and the conveyance center is.

Further features of the present disclosure will become apparent from the following description of exemplary embodiments with reference to the attached drawings.

DESCRIPTION OF THE EMBODIMENTS

Exemplary embodiments according to the present disclosure will be described below with reference to the drawings. The dimensions, the materials, the shapes, and the relative arrangement of the components described in the following exemplary embodiments, however, do not limit the scope of application of this technique to them only, unless specifically stated otherwise.

<Image Forming Apparatus>

Figure 1:
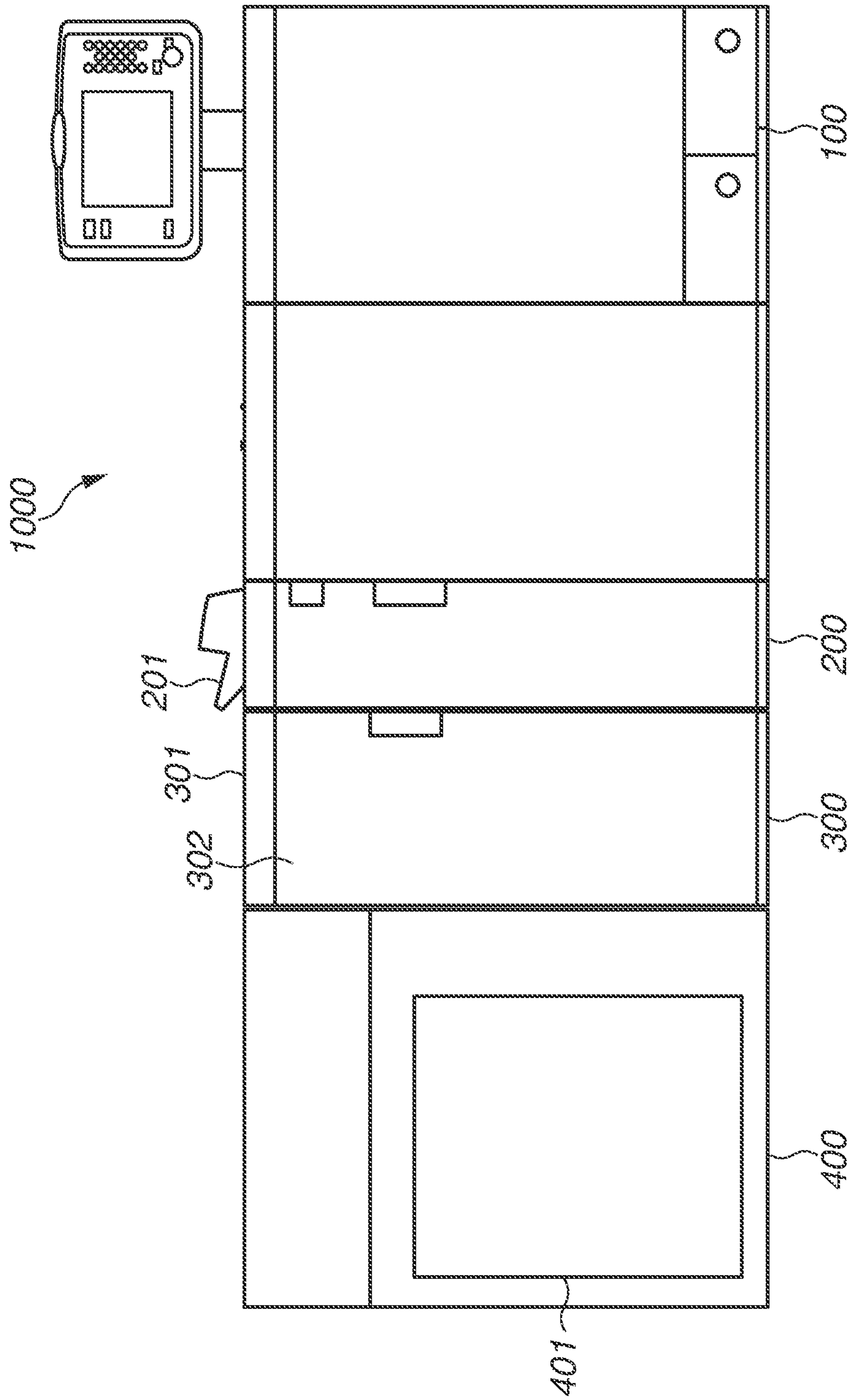
FIG. 1 is a diagram illustrating an entirety of an image forming apparatus.

FIG. 1 is diagram illustrating an entirety of a hard configuration of an image forming apparatus 1000 according to an exemplary embodiment. The image forming apparatus 1000 includes a printing apparatus 100, an inserter 200, a static elimination apparatus 300, and a large-capacity stacker 400. The printing apparatus 100 forms an image on a sheet based on an instruction from an external apparatus (not illustrated). The inserter 200 conveys a sheet that has been conveyed from the printing apparatus 100 to the static elimination apparatus 300. The inserter 200 is capable of feeding an insertion sheet from a feeding tray 201 and inserting the insertion sheet between a plurality of sheets conveyed from the printing apparatus 100. The static elimination apparatus 300 eliminates static from the sheet conveyed from the printing apparatus 100 via the inserter 200. The large-capacity stacker 400, which has a large capacity, stacks the sheet conveyed from the static elimination apparatus 300. The sheet that has conveyed from the printing apparatus 100 via the inserter 200 and the static elimination apparatus 300 is discharged to an ejection tray 401 of the large-capacity stacker 400.

The image forming apparatus 1000 according to the present exemplary embodiment includes the printing apparatus 100, the inserter 200, the static elimination apparatus 300, and the large-capacity stacker 400. The configuration of the image forming apparatus 1000, however, is not limited to this. For example, a configuration may be employed in which the image forming apparatus 1000 further includes another finisher downstream of the large-capacity stacker 400. In another embodiment, the static elimination apparatus 300 may be directly connected to the printing apparatus 100, and the image forming apparatus 1000 may exclude the inserter 200 and the large-capacity stacker 400. A configuration may be employed in which in the image forming apparatus 1000, the static elimination apparatus 300 is integrally provided within a housing 110 (FIG. 2) of the printing apparatus 100.

<Printing Apparatus>

Figure 2:
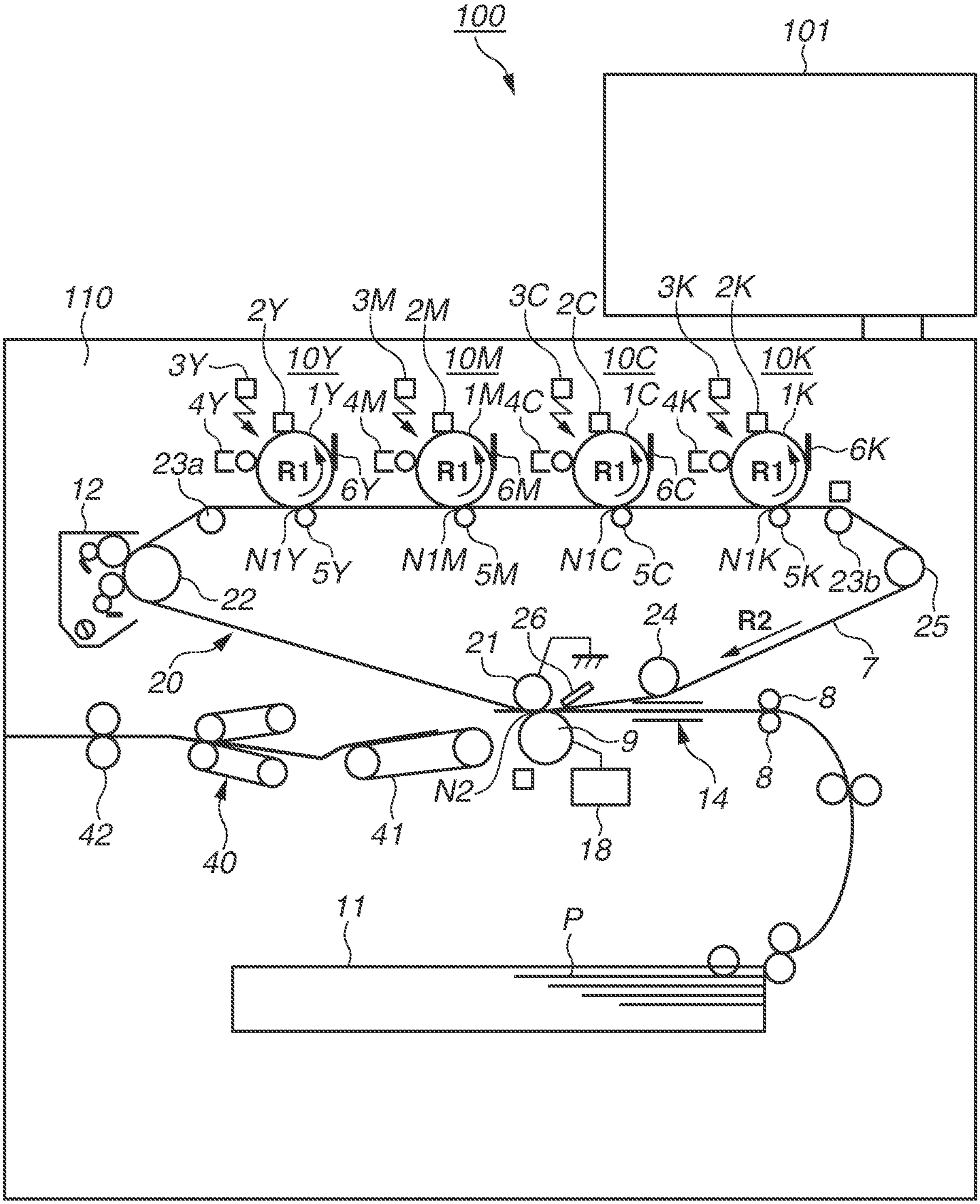
FIG. 2 is a schematic sectional view of a printing apparatus.

FIG. 2 is a schematic sectional view of the printing apparatus 100. The printing apparatus 100 according to the present exemplary embodiment is a tandem multifunction peripheral employing an intermediate transfer method (having the functions of a copying machine, a printer, and a facsimile apparatus). For example, the printing apparatus 100 can form a full-color image on a sheet (a transfer material, a sheet material, a recording medium, or a medium) P, such as paper, using an electrophotographic method according to an image signal transmitted from an external apparatus.

The printing apparatus 100 includes four image forming units 10Y, 10M, 10C, and 10K that form yellow (Y), magenta (M), cyan (C), and black (K) images, respectively, as a plurality of image forming units (stations). The image forming units 10Y, 10M, 10C, and 10K are arranged in a line along the moving direction of an image transfer surface of an intermediate transfer belt 7 (described below). The image transfer surface is approximately horizontally arranged. Among the image forming units 10Y, 10M, 10C, and 10K, components having the same or corresponding functions or configurations are occasionally collectively described by omitting "Y", "M", "C", and "K" at the ends of signs indicating components corresponding to the respective colors. The image forming unit 10 includes a photosensitive drum 1 (1Y, 1M, 1C, and 1K), a charging device 2 (2Y, 2M, 2C, and 2K), an exposure device 3 (3Y, 3M, 3C, and 3K), a development device 4 (4Y, 4M, 4C, and 4K), a primary transfer roller 5 (5Y, 5M, 5C, and 5K), and a cleaning device 6 (6Y, 6M, 6C, and 6K).

A driving force is transmitted from a drum driving motor (not illustrated) to the photosensitive drum 1 that is a rotatable drum-type (cylindrical) photosensitive member serving as a first image bearing member that bears a toner image, and the photosensitive drum 1 is rotationally driven in the direction of an arrow R1 (counterclockwise) in FIG. 2. The surface of the rotating photosensitive drum 1 is uniformly subjected to a charging process to a predetermined potential having a predetermined polarity (a negative polarity in the present exemplary embodiment) by the charging device 2 serving as a charging unit. In the charging process, a predetermined charging voltage is applied from a charging power supply (not illustrated) to the charging device 2. The surface of the photosensitive drum 1 having been subjected to the charging process is scanned and exposed by the exposure device 3 serving as an exposure unit according to an image signal, thus forming an electrostatic latent image on the photosensitive drum 1. In the present exemplary embodiment, the exposure device 3 includes a laser scanner device that emits laser light modulated according to image information onto the photosensitive drum 1. Toner as developer is supplied from the development device 4 as a development unit to the electrostatic image formed on the photosensitive drum 1, thus developing the electrostatic image and forming a toner image on the photosensitive drum 1. In the present exemplary embodiment, toner charged to the same polarity as the charge polarity of the photosensitive drum 1 is attached to an exposed portion on the photosensitive drum 1 in which the absolute value of the potential is decreased by uniformly performing the charging process on the photosensitive drum 1 and then exposing the photosensitive drum 1. The development device 4 includes a development roller that is a rotatable developer bearing member that bears developer and conveys the developer to a development position that is a portion opposed to the photosensitive drum 1. The development roller is rotationally driven by, for example, a driving system of the photosensitive drum 1 transmitting a driving force to the development roller. In the development, a predetermined development voltage is applied from a development power supply (not illustrated) to the development roller.

The intermediate transfer belt 7 that is a rotatable intermediate transfer member formed of an endless belt as a second image bearing member that bears the toner images is placed to be opposed to the four photosensitive drums 1Y, 1M, 1C, and 1K. The intermediate transfer belt 7 is stretched around a driving roller 22, an upstream assistance roller 23*a*, a downstream assistance roller 23*b*, a tension roller 25, a pre-secondary-transfer roller 24, and an inner roller 21. These rollers serve as a plurality of stretching rollers. The intermediate transfer belt 7 is stretched with a predetermined tension. The driving roller 22 transmits a driving force to the intermediate transfer belt 7. The tension roller 25 applies a predetermined tension to the intermediate transfer belt 7 to control the tension of the intermediate transfer belt 7 to be constant. The pre-secondary-transfer roller 24 forms a surface of the intermediate transfer belt 7 upstream of and near a secondary transfer nip N2 with respect to the rotational direction of the intermediate transfer belt 7. The inner roller 21 functions as an opposing member of an outer roller 9. The upstream assistance roller 23*a* and the downstream assistance roller 23*b* form an approximately horizontal image transfer surface. A driving force is transmitted from a belt driving motor (not illustrated) to the driving roller 22 to rotationally drive the driving roller 22. Thus, drive is input from the driving roller 22 to the intermediate transfer belt 7, so that the intermediate transfer belt 7 rotates in the direction of an arrow R2 (clockwise) in FIG. 2. In the present exemplary embodiment, the intermediate transfer belt 7 is rotationally driven so that the peripheral speed of the intermediate transfer belt 7 is 150 to 470 mm/sec. Among the plurality of stretching rollers, the stretching rollers other than the driving roller 22 are driven to rotate according to the rotation of the intermediate transfer belt 7. On the inner peripheral surface side of the intermediate transfer belt 7, the primary transfer rollers 5Y, 5M, 5C, and 5K that are roller-like primary transfer members serving as a primary transfer unit are placed to correspond to the photosensitive drums 1Y, 1M, 1C, and 1K, respectively. The primary transfer roller 5 presses the intermediate transfer belt 7 toward the photosensitive drum 1 and forms a primary transfer nip N1 serving as a primary transfer portion that is a contact portion between the photosensitive drum 1 and the intermediate transfer belt 7. On the inner peripheral surface side of the intermediate transfer belt 7, a pressing member 26 is provided upstream of the inner roller 21 and downstream of the pre-secondary-transfer roller 24 with respect to the rotational direction of the intermediate transfer belt 7. The pressing member 26 comes into contact with the inner peripheral surface of the intermediate transfer belt 7 and presses the intermediate transfer belt 7 from the inner peripheral surface side to the outer peripheral surface side.

The toner image formed on the photosensitive drum 1 as described above is primarily transferred onto the intermediate transfer belt 7 that is rotating by the action of the primary transfer roller 5 at the primary transfer nip N1. In the primary transfer, a primary transfer voltage that is a direct-current voltage having a polarity (a positive polarity in the present exemplary embodiment) opposite to the normal charge polarity of the toner is applied from a primary transfer power supply (not illustrated) to the primary transfer roller 5. For example, when a full-color image is formed, the toner images of yellow, magenta, cyan, and black colors formed on the photosensitive drums 1Y, 1M, 1C, and 1K are sequentially primarily transferred in a superimposed manner in the same image forming region on the intermediate transfer belt 7. In the present exemplary embodiment, the primary transfer nip N1 serves as an image forming position at which the toner image is formed on the intermediate transfer belt 7. The intermediate transfer belt 7 is an example of a rotatable endless belt that conveys the toner image borne at the image forming position.

On the outer peripheral surface side of the intermediate transfer belt 7, the outer roller 9 that is a roller-like secondary transfer member serving as a secondary transfer unit is placed at a position opposed to the inner roller 21. The outer roller 9 is pressed toward the inner roller 21 through the intermediate transfer belt 7 and forms a secondary transfer nip N2 serving as a secondary transfer portion that is a contact portion between the intermediate transfer belt 7 and the outer roller 9. The toner image formed on the intermediate transfer belt 7 as described above is secondarily transferred onto a sheet P that is being conveyed while being nipped between the intermediate transfer belt 7 and the outer roller 9 by the action of the outer roller 9 at the secondary transfer nip N2. In the secondary transfer, a secondary transfer voltage that is a direct-current voltage having a polarity (a positive polarity in the present exemplary embodiment) opposite to the normal charge polarity of the toner and controlled to be a constant voltage is applied from a secondary transfer power supply 18 to the outer roller 9. In the present exemplary embodiment, for example, a secondary transfer voltage of +1 to +7 kV is applied, and a secondary transfer current of +40 to +120 μA is applied, thus secondarily transferring the toner image on the intermediate transfer belt 7 onto the sheet P. In the present exemplary embodiment, the inner roller 21 is electrically grounded (connected to the ground). Using the inner roller 21 as the secondary transfer member, a secondary transfer voltage having the same polarity as the normal charge polarity of the toner may be applied to the inner roller 21, and the outer roller 9 may be used as an opposing electrode and electrically grounded.

The sheet P is conveyed to the secondary transfer nip N2 with the timings of the sheet P and the toner image on the intermediate transfer belt 7 matched. That is, the sheet P stored in a recording material cassette 11 as a recording material storage unit is conveyed to registration rollers 8 by feeding rollers and temporarily stopped. The sheet P is sent to the secondary transfer nip N2 by the registration rollers 8 being rotationally driven so that the toner image on the intermediate transfer belt 7 and a desired image forming region on the sheet P match each other at the secondary transfer nip N2. A conveyance guide 14 for guiding the sheet P to the secondary transfer nip N2 is provided downstream of the registration rollers 8 and upstream of the secondary transfer nip N2 with respect to the sheet conveyance direction of the sheet P (hereinafter simply referred to as the "conveyance direction").

The sheet P to which the toner image has been transferred is conveyed to a fixing unit 40 serving as a fixing unit by a pre-fixing conveyance unit 41. The pre-fixing conveyance unit 41 has a belt member formed of a rubber material, such as ethylene-propylene-diene rubber (EPDM) and having a width of 100 to 110 mm and a thickness of 1 to 3 mm in a rotationally movable manner in a center portion with respect to the sheet width direction (hereinafter simply referred to as the "width direction") orthogonal to the conveyance direction of the sheet P. The pre-fixing conveyance unit 41 conveys the sheet P on the belt member. The belt member has a hole having a diameter of 3 to 7 mm and suctions air from the inner peripheral surface side of the belt member, thus increasing the bearing force of the sheet P and stabilizing the conveyance performance for the sheet P. The fixing unit 40 heats and pressurizes the sheet P bearing the unfixed toner image in the process of conveying the sheet P by a fixing rotating member pair nipping the sheet P, thus fixing (melting or firmly fixing) the toner image on the surface of the sheet P. The sheet P to which the toner image is fixed is then conveyed to the inserter 200 by an exit roller pair 42.

Toner remaining on the photosensitive drum 1 after the primary transfer is removed from the photosensitive drum 1 by the cleaning device 6 serving as a cleaning unit and collected. Toner remaining on the intermediate transfer belt 7 after the secondary transfer and adhering substances, such as paper dust adhering to the intermediate transfer belt 7 from the sheet P, are removed from the intermediate transfer belt 7 by a belt cleaning device 12 serving as an intermediate transfer member cleaning unit and collected. In the present exemplary embodiment, the belt cleaning device 12 cleans the intermediate transfer belt 7 by electrostatically collecting adhering substances, such as secondary transfer residual toner on the intermediate transfer belt 7.

In the present exemplary embodiment, an intermediate transfer belt unit 20 that is a belt conveyance device includes the intermediate transfer belt 7 stretched around the plurality of stretching rollers, the primary transfer rollers 5Y, 5M, 5C, and 5K, the belt cleaning device 12, and frames supporting these components. The intermediate transfer belt unit 20 is supported to be attachable to and detachable from a housing 110 of the printing apparatus 100 for maintenance or replacement. As the intermediate transfer belt 7, a belt formed of a resin material having a monolayer or multilayer structure, or a belt having a multilayer structure including an elastic layer formed of an elastic material can be used.

In the present exemplary embodiment, the primary transfer roller 5 is provided with an elastic layer formed of an ion-conductive foamed rubber on the outer periphery of a metal core member. In the present exemplary embodiment, the primary transfer roller 5 has an outer diameter of 15 to 20 mm and has an electrical resistance value of $1\times10^5$ to $1\times10^8\Omega$ in a case where the electrical resistance value is measured with a voltage of 2 kV applied in an environment with a temperature of 23° C. and a relative humidity (RH) of 50%.

In the present exemplary embodiment, the outer roller 9 is provided with an elastic layer formed of an ion-conductive foamed rubber on the outer periphery of a metal core member. In the present exemplary embodiment, the outer roller 9 has an outer diameter of 20 to 25 mm and has an electrical resistance value of $1\times10^5$ to $1\times10^8\Omega$ in a case where the electrical resistance value is measured with a voltage of 2 kV applied in an environment with a temperature of 23° C. and an RH of 50%. The outer roller 9 abuts the inner roller 21 with the intermediate transfer belt 7 therebetween at a predetermined pressure, thus forming the secondary transfer nip N2.

In the present exemplary embodiment, the inner roller 21 is provided with an elastic layer formed of an electron-conductive rubber on the outer periphery of a metal core member. In the present exemplary embodiment, the inner roller 21 has an outer diameter of 20 to 22 mm and has an electrical resistance value of $1\times10^5$ to $1\times10^8\Omega$ in a case where the electrical resistance value is measured with a voltage of 50 V applied in an environment with a temperature of 23° C. and an RH of 50%. For example, the pre-secondary-transfer roller 24 has a configuration similar to that of the inner roller 21. In the present exemplary embodiment, the rotational axis directions of the stretching rollers of the intermediate transfer belt 7 including the inner roller 21 and the outer roller 9 are approximately parallel to each other.

<Static Elimination Apparatus>

Figure 3:
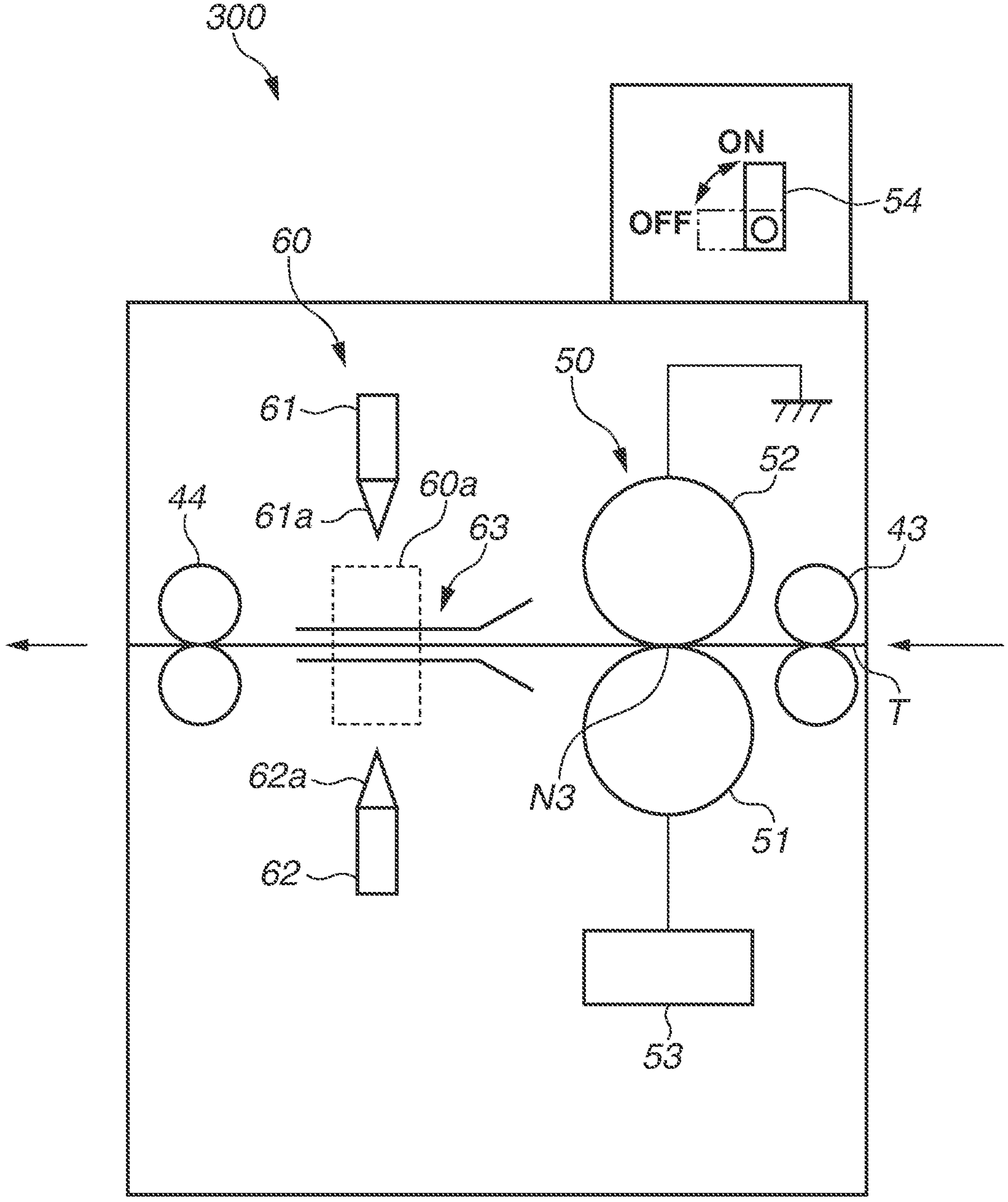
FIG. 3 is a schematic sectional view of a static elimination apparatus.

Next, the static elimination apparatus 300 according to the present exemplary embodiment is described with reference to FIG. 3. FIG. 3 is a schematic sectional view of the static elimination apparatus 300. In the image forming apparatus 1000, the static elimination apparatus 300 is placed downstream of the printing apparatus 100 and the inserter 200. The sheet P may be charged through the image forming process of the printing apparatus 100 described above. If the sheet P is charged, a plurality of sheets P ejected to the ejection tray 401 may stick together due to an electrostatic force, which may lead to a stacking failure. Accordingly, in the present exemplary embodiment, the static elimination apparatus 300 performs a static elimination process on the sheet P on which an image has been formed by the printing apparatus 100.

The static elimination apparatus 300 includes a static elimination roller pair 50 serving as a contact static elimination unit that eliminates static from a sheet in the state where the contact static elimination unit is in contact with the sheet (a contact state), and a non-contact static elimination section 60 that eliminates static from the sheet in the state where the non-contact static elimination section 60 is not in contact with the sheet (a non-contact state). The static elimination apparatus 300 includes an entrance roller pair 43 that receives the sheet from the inserter 200 and conveys the sheet along a conveyance path T, and an exit roller pair 44 that ejects the sheet from which static has been eliminated by the static elimination roller pair 50 and the non-contact static elimination section 60 to the large-capacity stacker 400. The entrance roller pair 43 and the exit roller pair 44 are an example of a conveyance unit according to the present exemplary embodiment.

The static elimination roller pair 50 includes a static elimination roller 51 that rotates in contact with the lower surface of the sheet, and a static elimination opposing roller 52 that rotates in contact with the upper surface of the sheet. The static elimination roller 51 is provided with an elastic layer formed of an ion-conductive foamed rubber on the outer periphery of a metal core member. In the present exemplary embodiment, the static elimination roller 51 has an outer diameter of 20 to 25 mm and has an electrical resistance value of $1\times10^5$ to $1\times10^8\Omega$ in a case where the electrical resistance value is measured with a voltage of 2 kV applied in an environment with a temperature of 23° C. and an RH of 50%. For example, the static elimination roller 51 can be a member similar to the outer roller 9. The static elimination opposing roller 52 has an outer diameter of 20 to 25 mm and forms a static elimination nip portion N3 with the static elimination roller 51.

Initially, the static elimination nip portion N3 of the static elimination roller pair 50 roughly removes charges from the sheet conveyed from the printing apparatus 100. A static elimination voltage that is a direct-current voltage having a polarity (a negative polarity in the present exemplary embodiment) opposite to that of the secondary transfer member (the outer roller 9) and controlled to be a constant voltage is applied from a static elimination power supply 53 to the static elimination roller 51. In the present exemplary embodiment, for example, a static elimination voltage of −1 to −7 kV is applied. In the static elimination apparatus 300, a switch 54 is provided. An operator can switch the turning on and off of the application of a voltage to the static elimination roller pair 50 using the switch 54. The static elimination opposing roller 52 is electrically grounded (connected to the ground).

Next, the non-contact static elimination section 60 provided downstream of the static elimination roller pair 50 eliminates static from the sheet that has passed through the static elimination roller pair 50. The non-contact static elimination section 60 removes charges on the sheet from which static is not completely eliminated by the static elimination roller pair 50. The non-contact static elimination section 60 includes a non-contact static elimination unit 61 (a first non-contact static elimination unit or an upper static elimination unit) provided above the conveyance path T, and a non-contact static elimination unit 62 (a second non-contact static elimination unit or a lower static elimination unit) provided below the conveyance path T. In other words, the non-contact static elimination units 61 and 62 are placed both above and below the conveyance path T in the non-contact static elimination section 60 in the present exemplary embodiment. In the present exemplary embodiment, the non-contact static elimination units 61 and 62 are ionizers that include, respectively, static elimination needles 61*a* and 62*a* that generate ions for eliminating static from the sheet and emit the ions toward the sheet that is being conveyed through a static elimination region 60*a* to eliminate static. The static elimination needle 61*a* is an example of a first ion emission unit, and the static elimination needle 62*a* is an example of a second ion emission unit. Alternatively, non-contact static elimination units including discharge wires may be used as the non-contact static elimination units 61 and 62, for example.

The non-contact static elimination section 60 is further provided with a guide unit 63 forming a part of the conveyance path T (the static elimination region 60*a*). The guide unit 63 is placed below the non-contact static elimination unit 61 and above the non-contact static elimination unit 62 in the vertical direction. In other words, the guide unit 63 is placed between the non-contact static elimination units 61 and 62. In the non-contact static elimination section 60, when the sheet passes through the guide unit 63, the non-contact static elimination units 61 and 62 eliminate static from the sheet. In the present exemplary embodiment, the sheet is delivered from the static elimination roller pair 50 to the guide unit 63.

<Guide Unit>

Figure 4:
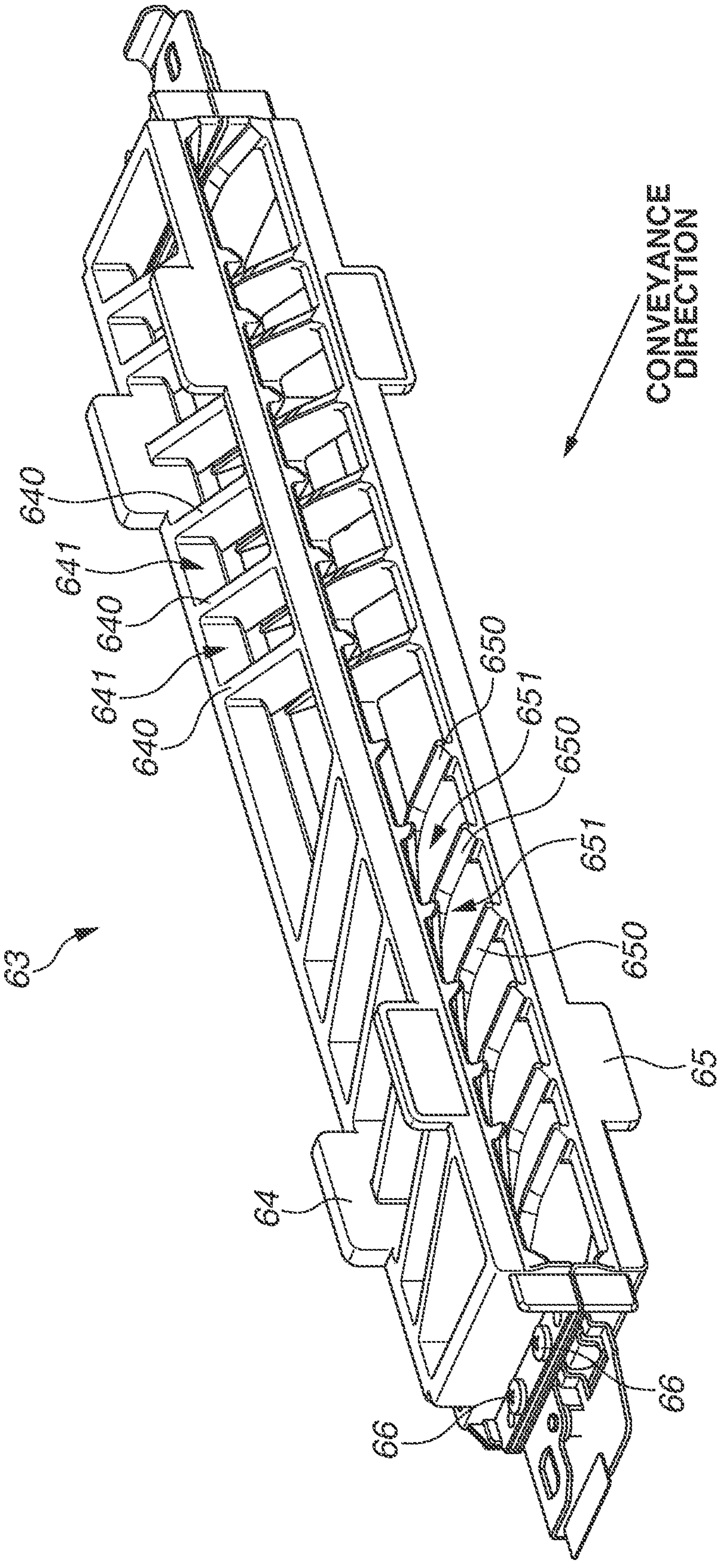
FIG. 4 is a perspective view of a guide unit.

FIG. 4 is a perspective view of the guide unit 63. The guide unit 63 includes an upper guide member 64 (a first guide member) that guides the sheet while facing the upper surface of the sheet, and a lower guide member 65 (a second guide member) that guides the sheet while facing the lower surface of the sheet.

The lower guide member 65 forms the static elimination region 60*a* in the conveyance path T with the upper guide member 64. The sheet that has passed through the static elimination roller pair 50 is conveyed between the upper guide member 64 and the lower guide member 65. In the present exemplary embodiment, each of the upper guide member 64 and the lower guide member 65 includes an insulating resin material and has a volume resistivity of $1\times10^{14}$ Ω·cm. The upper guide member 64 and the lower guide member 65 are fixed to each other by a plurality of screws 66 provided in both end portions in the width direction, thereby forming a single guide unit 63.

In the upper guide member 64, a plurality of ribs 640 arranged next to each other in the width direction and a plurality of openings 641 formed between the plurality of ribs 640 are provided. The plurality of ribs 640 provided in the upper guide member 64 is an upper surface contact portion that guides the sheet while contacting the upper surface of the sheet. The plurality of ribs 640 is formed to extend in a direction inclined relative to the conveyance direction. For example, the angle of each rib 640 to the conveyance direction (the angle between the rib 640 and the conveyance direction) is in the range from 20° to 50°. The plurality of openings 641 exposes the static elimination needle 61*a* of the non-contact static elimination unit 61 to the conveyance path T. In the lower guide member 65, as with the upper guide member 64, a plurality of ribs 650 arranged next to each other in the width direction and a plurality of openings 651 formed between the plurality of ribs 650 are provided. The plurality of ribs 650 provided in the lower guide member 65 is a lower surface contact portion that guides the sheet in contact with the lower surface of the sheet. In FIG. 4, only some of the ribs 640 and 650 and the openings 641 and 651 are designated by signs for simplicity of the drawings. In the present exemplary embodiment, the upper guide member 64 and the lower guide member 65 have similar shapes.

The ribs 640 of the upper guide member 64 guide the sheet in contact with the upper surface of the sheet, and the ribs 650 of the lower guide member 65 guide the sheet while contacting the lower surface of the sheet. Ions emitted from the non-contact static elimination unit 61 pass through the openings 641 of the upper guide member 64 and are emitted to the upper surface of the sheet. Ions emitted from the non-contact static elimination unit 62 pass through the openings 651 of the lower guide member 65 and are emitted to the lower surface of the sheet. The openings 641 and 651 are thus formed in the guide unit 63, so that ions emitted from the non-contact static elimination units 61 and 62 are not physically blocked. Thus, the non-contact static elimination section 60 can eliminate static from the sheet.

<Shapes of Guide Members>

Figure 5:
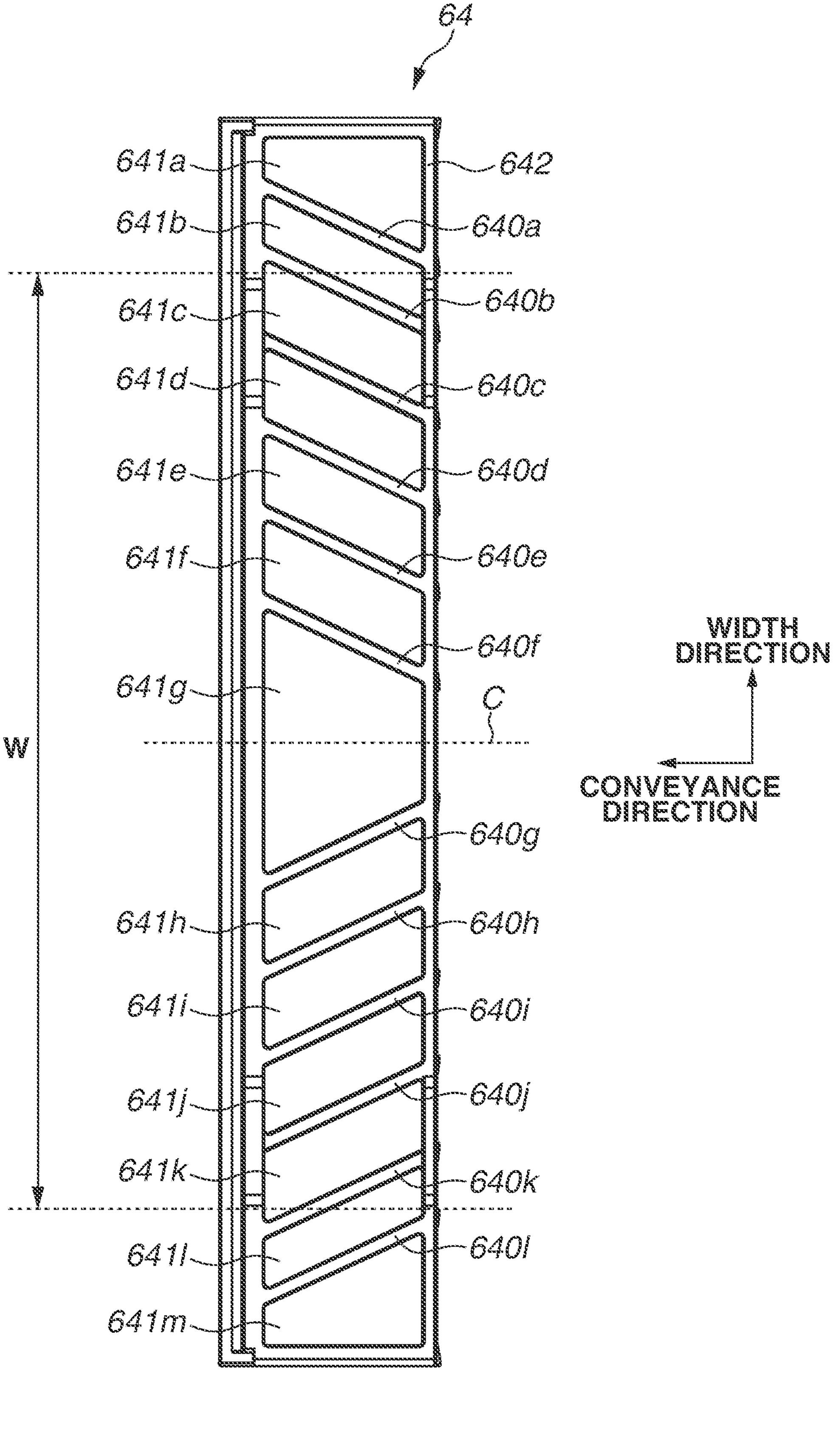
FIG. 5 is a top view of an upper guide member.

Next, the shape of the upper guide member 64 is described. In the present exemplary embodiment, since the lower guide member 65 has a shape similar to that of the upper guide member 64, the lower guide member 65 is not described. FIG. 5 is a top view of the upper guide member 64. In FIG. 5, a conveyance center C is the center position of a region to which the sheet is conveyed in the width direction. The upper guide member 64 includes the plurality of ribs 640 (640*a* to 640*l*), the plurality of openings 641 (641*a* to 641*m*), and a frame portion 642 forming the outer periphery of the upper guide member 64. The ribs 640*a* to 640*f* are an example of a first rib placed on an apparatus far side (one side) with respect to the conveyance center C, and the ribs 640*g* to 640*l* are an example of a second rib placed on an apparatus near side (the other side) with respect to the conveyance center C.

Figure 6:
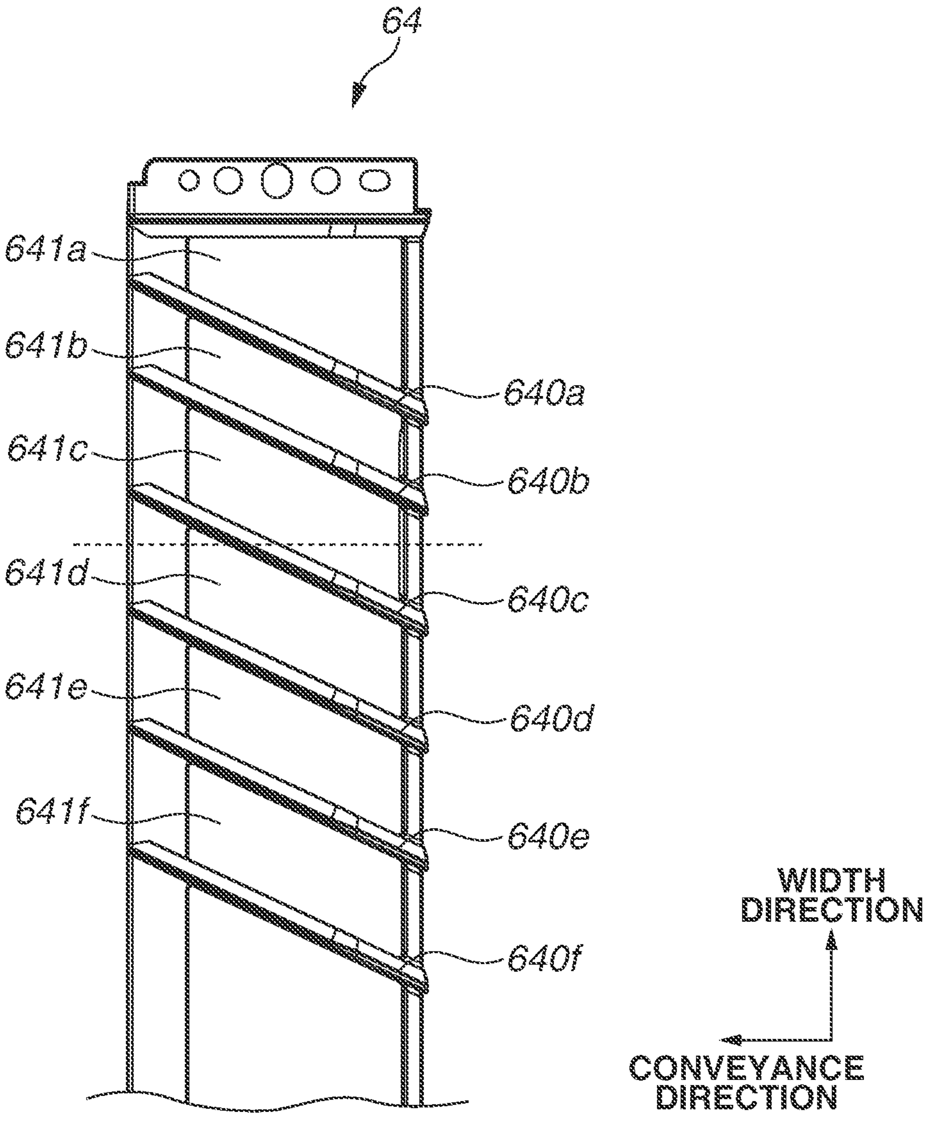
FIG. 6 is an enlarged view illustrating an apparatus far side of the upper guide member.

FIG. 6 is an enlarged view of the apparatus far side of the upper guide member 64. In the upper guide member 64, the interval between two ribs 640 adjacent to each other at positions close to the conveyance center C is greater than the interval between two ribs 640 adjacent to each other at positions far from the conveyance center C. More specifically, the width of the opening 641*f* between the ribs 640*e* and 640*f* close to the conveyance center C is greater than the opening 641*b* between the ribs 640*a* and 640*b* far from the conveyance center C. In the present exemplary embodiment, the sizes of the openings 641*d*, 641*e*, and 641*f* are equal to each other. In the present exemplary embodiment, the ribs 640*a* to 640*f* placed on the apparatus far side and the ribs 640*g* to 640*l* placed on the apparatus near side are placed symmetrically about the conveyance center C.

In other words, the upper guide member 64 has a symmetrical shape in the width direction. Thus, the width of the opening 641*h* between the ribs 640*g* and 640*h* close to the conveyance center C is greater than the opening 641*l* between the ribs 640*k* and 640*l* far from the conveyance center C. The plurality of ribs 640 is thus placed symmetrically about the conveyance center C in the width direction, so that conveyance resistance applied to the sheet that is conveyed is approximately the same on the left and the right, and the skew of the sheet is prevented.

A region W in FIG. 5 is a region having a width of 250 mm with the conveyance center C at its center. In the region W of the upper guide member 64, the plurality of ribs 640 is placed so that only one of the ribs 640 abuts the end portion in the width direction of the sheet. That is, in the region W, the plurality of ribs 640 (640*c* to 640*j*) is placed so as not to overlap each other when viewed in the conveyance direction. In contrast, further outside of the region W, the plurality of ribs 640 is placed so that two of the ribs 640 abut the end portion of the sheet. That is, outside the region W, the plurality of ribs 640 (640*a*, 640*b*, 640*k*, and 640*l*) is placed to overlap each other when viewed in the conveyance direction. The plurality of ribs 640 is thus placed, so that the widths of the openings 641 increase in the region W in the center in the width direction. This improves the static elimination efficiency of the non-contact static elimination section 60.

Further outside of the region W in the width direction, two of the ribs 640 come into contact with the end portion of the sheet. This improves conveyance performance for a sheet having a large width.

When the upper guide member 64 is viewed from above, the proportion (the opening ratio) of the total area of the plurality of openings 641 to the area of the entirety of the upper guide member 64 (the frame portion 642) is 60% or more. The upper guide member 64 has a shape in which the proportion of the openings 641 is 60% or more at any position in the width direction. The opening ratio of the upper guide member 64 is 60% or more, so that ions generated by the non-contact static elimination unit 61 are efficiently emitted to the sheet.

As illustrated in FIG. 5, the plurality of ribs 640 of the upper guide member 64 extend to be inclined relative to the conveyance direction so that the further downstream in the conveyance direction each rib 640 is, the greater the distance between the rib 640 and the conveyance center C is. In other words, the plurality of ribs 640 is inclined relative to the conveyance direction so that the further downstream in the conveyance direction each rib 640 is, the further outward in the width direction the rib 640 is. More specifically, the ribs 640*a* to 640*f* placed on the apparatus far side are inclined to the apparatus far side, and the ribs 640*g* to 640*l* placed on the apparatus near side are inclined to the apparatus near side. For example, the further downstream in the conveyance direction the rib 640*a* placed on one side of the conveyance center C and the rib 640*l* placed on the other side of the conveyance center C are, the further away from each other the ribs 640*a* and 640*l* are inclined.

Figure 7:
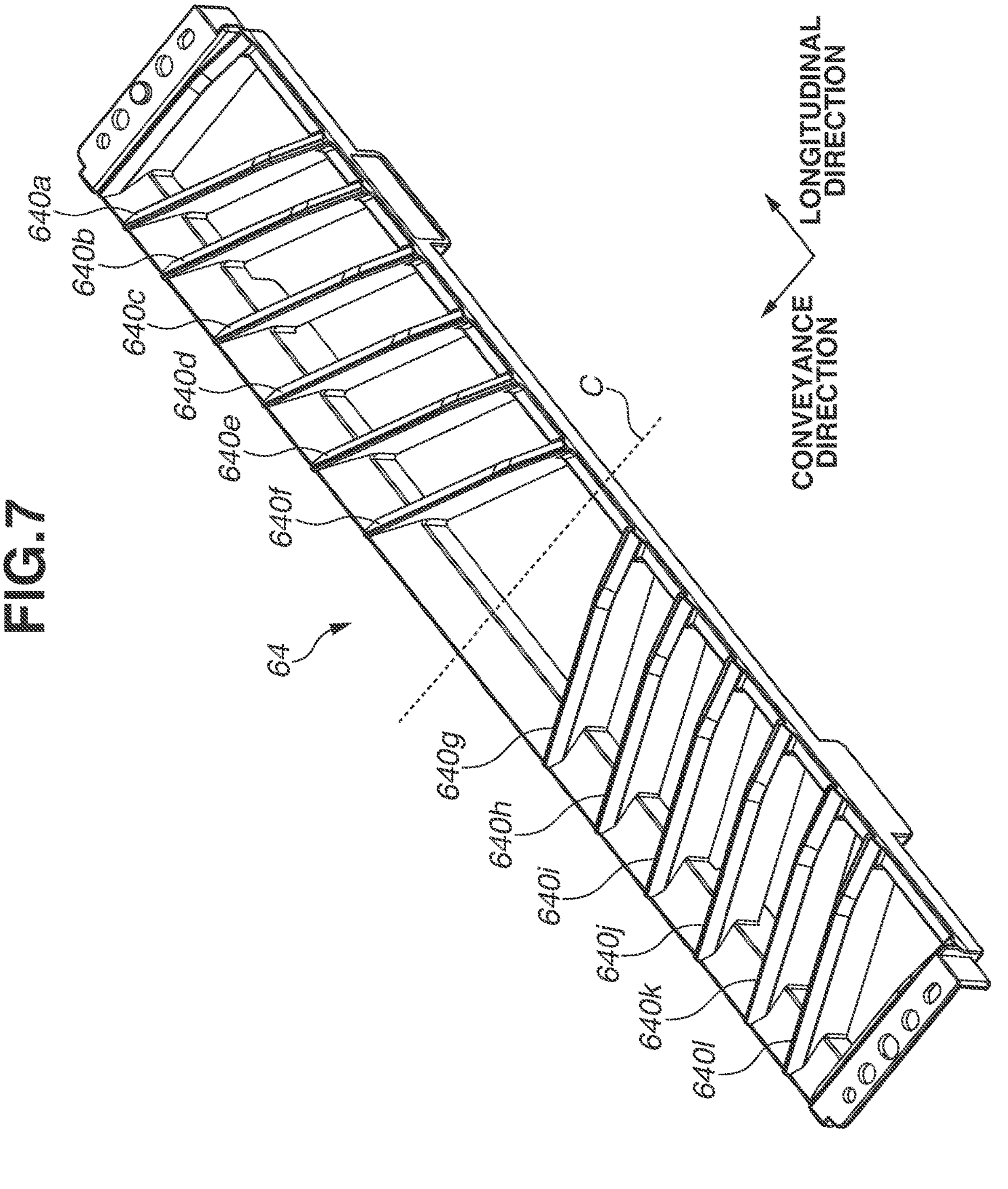
FIG. 7 is a perspective view of the upper guide member when viewed from a conveyance path side.
Figure 8:
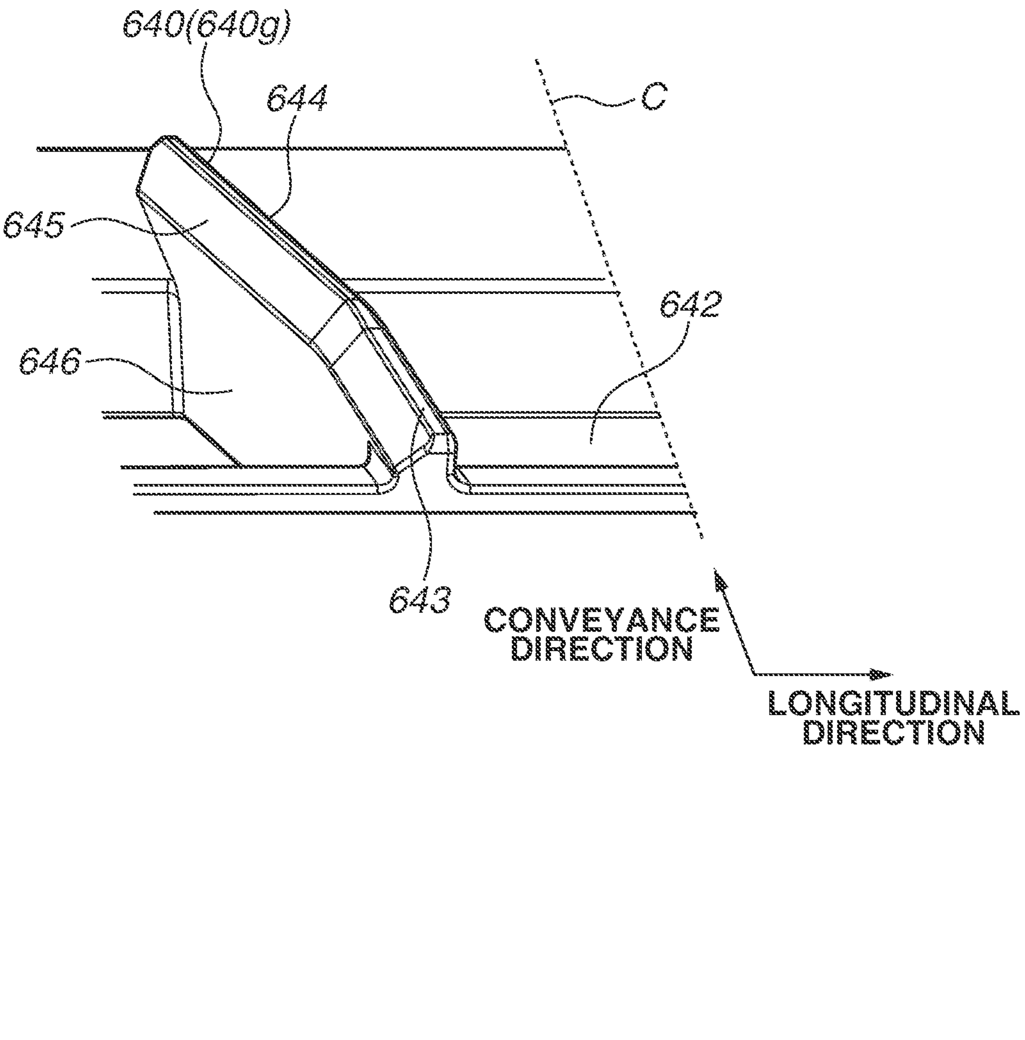
FIG. 8 is an enlarged view illustrating a rib of the upper guide member.
Figure 9:
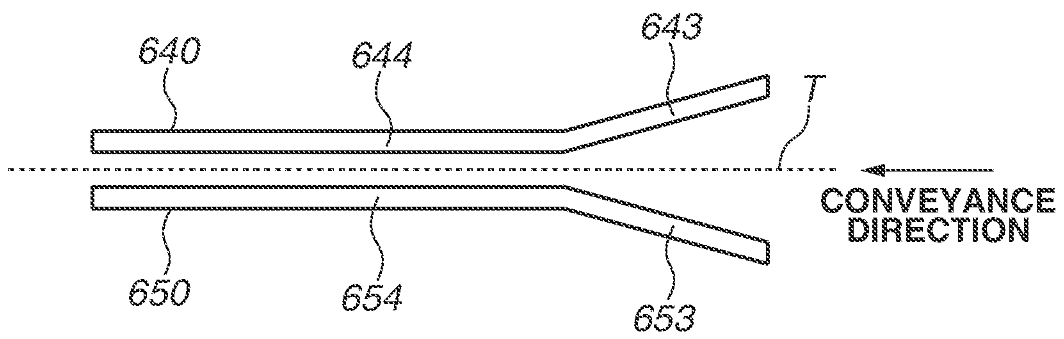
FIG. 9 is a side view illustrating an inclined portion of the rib.

Next, details of the shapes of the ribs 640 are described. FIG. 7 is a perspective view of the upper guide member 64 as viewed from the conveyance path T side. FIG. 8 is an enlarged view of a rib 640 (640*g*). FIG. 9 is a side view of the rib 640 of the upper guide member 64 and a rib 650 of the lower guide member 65 as viewed from the width direction. In the present exemplary embodiment, the ribs 640*h* to 640*l* have shapes similar to that of the rib 640*g*, and the ribs 640*a* to 640*f* have shapes symmetrical to that of the rib 640*g* with respect to the conveyance center C.

The rib 640 of the upper guide member 64 includes an inclined portion 643 (a first inclined portion) inclined so that the further downstream in the conveyance direction the inclined portion 643 is, the smaller the distance between the inclined portion 643 and the lower guide member 65 is, and a downstream contact portion 644 extending downstream in the conveyance direction from the inclined portion 643. The inclined portion 643 forms the upstream side of a contact surface (the top) of the rib 640 that comes into contact with the sheet, and the downstream contact portion 644 forms the downstream side of the contact surface (the top) of the rib 640. The rib 650 of the lower guide member 65 includes an inclined portion 653 (a second inclined portion) inclined so that the further downstream in the conveyance direction the inclined portion 653 is, the smaller the distance between the inclined portion 653 and the upper guide member 64 is, and a downstream contact portion 654 extending downstream in the conveyance direction from the inclined portion 653. The downstream contact portions 644 and 654 are surfaces extending parallel to the conveyance direction. As illustrated in FIG. 9, the shape of the conveyance path T is such that a gap in the thickness direction of the sheet (a space through which the sheet passes) is large upstream in the conveyance direction due to the shapes of the inclined portions 643 and 653, and the further downstream in the conveyance direction the conveyance path T is, the narrower the space through which the sheet passes is. The inclined portions 643 and 653 may have shapes extending in a curved manner when viewed from the width direction.

The rib 640 includes a side surface inclined portion 645 formed continuously from the inclined portion 643 and the downstream contact portion 644, and a side surface 646 formed continuously from the side surface inclined portion 645. The side surface inclined portion 645 is a surface formed continuously from the end portions of the inclined portion 643 and the downstream contact portion 644 on the side further from the conveyance center C and inclined so that the further away from the conveyance center C the side surface inclined portion 645 is, the further away from the lower guide member 65 the side surface inclined portion 645 is. The side surface 646 is a surface extending in the conveyance direction and the vertical direction (the thickness direction of the sheet). The side surface inclined portion 645 is a surface connecting the downstream contact portion 644 and the side surface 646.

When the sheet is conveyed from the static elimination roller pair 50 to the non-contact static elimination section 60, a corner of the front end of the sheet may enter the openings 641 and 651. In such a case, the side surface inclined portion 645 scoops up the end portion of the sheet to guide the sheet to the inclined portion 643 and the downstream contact portion 644.

As described above, the rib 640 of the upper guide member 64 includes the inclined portion 643 inclined so that the further downstream in the conveyance direction the inclined portion 643 is, the closer to the lower guide member 65 the inclined portion 643 is. Thus, the portion of the inclined portion 643 in the conveyance path T has a slope shape so that the further upstream in the conveyance direction the inclined portion 643 is, the wider the space through which the sheet passes is. Thus, for example, even if a sheet with a curled front end is conveyed, it is possible to reduce the occurrence of a jam resulting from the front end of the sheet hitting the upper guide member 64. In addition, the space of the inclined portion 643 through which the sheet passes decreases toward further downstream in the conveyance direction. Thus, the behavior of the sheet in the static elimination region 60*a* is stabilized, and it is possible to reduce a conveyance failure when static is eliminated from the sheet by the non-contact static elimination section 60.

As with the rib 640 of the upper guide member 64, the rib 650 of the lower guide member 65 includes the inclined portion 653 inclined so that the further downstream in the conveyance direction the inclined portion 653 is, the closer to the upper guide member 64 the inclined portion 653 is. Thus, it is possible to further reduce the occurrence of a jam when the sheet is conveyed to the guide unit 63.

The rib 640 of the upper guide member 64 extends to be inclined relative to the conveyance direction so that the further downstream in the conveyance direction the rib 640 is, the further away from the conveyance center C the rib 640 is. The rib 640 of the upper guide member 64 includes the side surface inclined portion 645 that is a surface inclined so that the further away from the conveyance center C the surface is, the further away from the lower guide member 65 the surface is. Thus, the end portion of the sheet that is conveyed initially abuts the side surface inclined portion 645, and then, the sheet is delivered to the inclined portion 643 and the downstream contact portion 644. Thus, it is possible to reduce the occurrence of a jam resulting from the end portion of the sheet hitting the side surface 646.

In the present exemplary embodiment, the lower guide member 65 has a shape similar to that of the upper guide member 64 and therefore can further reduce the occurrence of a jam. The lower guide member 65, however, may have a shape different from that of the upper guide member 64. For example, a configuration may be employed in which the rib 650 of the lower guide member 65 may guide the sheet with only the downstream contact portion 654 with the inclined portion 653 not being provided.

In the present exemplary embodiment, the contact portions of the guide members that guide the sheet include the plurality of ribs 640 and 650. The configurations of the contact portions, however, are not limited to this. For example, the contact portions of the guide members may include surfaces on which a plurality of openings arranged next to each other in the width direction is formed. In this case, it is desirable that the plurality of openings provided on guide surfaces of the guide members should be placed at positions corresponding to the static elimination needles 61*a* and 62*a*.

In the present exemplary embodiment, the ribs 640 and 650 linearly extend when viewed from above. The shapes of the ribs 640 and 650, however, are not limited to this. For example, the ribs 640 and 650 may be provided in a curved manner when viewed from above.

In the present exemplary embodiment, in the non-contact static elimination section 60 of the static elimination apparatus 300, the non-contact static elimination units 61 and 62 are provided on both above and below the conveyance path T. The configuration of the static elimination apparatus 300, however, is not limited to this. For example, a configuration may be employed in which in the static elimination apparatus 300, only the non-contact static elimination unit 61 is provided above the conveyance path T. That is, the upper guide member 64 may include the openings 641, and the lower guide member 65 may not include the openings 651. Similarly, in a configuration in which only the non-contact static elimination unit 62 is provided below the conveyance path T, the lower guide member 65 may include the openings 651, and the upper guide member 64 may not include the openings 641. The static elimination apparatus 300 according to the present exemplary embodiment includes both the non-contact static elimination section 60 and the static elimination roller pair 50. Alternatively, a configuration may be employed in which the static elimination apparatus 300 includes only the non-contact static elimination section 60.

According to the present disclosure, it is possible to provide a static elimination apparatus capable of reducing a conveyance failure when a sheet passes through a non-contact static elimination unit, and an image forming apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-011453, filed Jan. 30, 2023, which is hereby incorporated by reference herein in its entirety.

What is claimed is:

1. A static elimination apparatus comprising:

a conveyance unit configured to convey a sheet along a conveyance path;

a non-contact static elimination unit configured to eliminate static from the sheet in a state where the non-contact static elimination unit is not in contact with the sheet conveyed by the conveyance unit;

a first guide member including a contact portion configured to guide the sheet while contacting the sheet conveyed by the conveyance unit, and a plurality of openings arranged next to each other in a width direction of the sheet orthogonal to a sheet conveyance direction and configured to expose the non-contact static elimination unit to the conveyance path, wherein the first guide member serves as a part of the conveyance path; and a second guide member arranged to be opposed to the first guide member and serving as the part of the conveyance path with the first guide member, wherein the contact portion includes a plurality of first ribs arranged on one side with respect to a conveyance center in the sheet width direction, and a plurality of second ribs arranged on the other side with respect to the conveyance center in the sheet width direction, and wherein the plurality of first ribs and the plurality of second ribs are inclined relative to the sheet conveyance direction so that the further downstream in the sheet conveyance direction each rib is, the greater a distance between each rib and the conveyance center is.

2. The static elimination apparatus according to claim 1, wherein each of the plurality of first ribs and the plurality of second ribs includes, upstream in the sheet conveyance direction, an inclined portion inclined so that the further downstream in the sheet conveyance direction the inclined portion is, the smaller a distance between the inclined portion and the second guide member is.

3. The static elimination apparatus according to claim 2, wherein each of the plurality of first ribs and the plurality of second ribs includes a downstream contact portion that is continuous from the inclined portion and extends downstream in the sheet conveyance direction, and a side surface inclined portion that is continuous from the inclined portion and the downstream contact portion and inclined so that the further away from the conveyance center the side surface inclined portion is, the further away from the second guide member the side surface inclined portion is.

4. The static elimination apparatus according to claim 1, further comprising a static elimination roller pair configured to eliminate static from the sheet while contacting the sheet in an upstream side of the non-contact static elimination unit.

5. The static elimination apparatus according to claim 1, wherein the non-contact static elimination unit is a first non-contact static elimination unit arranged above the first guide member, the static elimination apparatus further comprising:

a second non-contact static elimination unit arranged below the second guide member and configured to eliminate static from the sheet in a state where the second non-contact static elimination unit is not in contact with the sheet conveyed by the conveyance unit, wherein the second guide member has a shape similar to a shape of the first guide member.

6. The static elimination apparatus according to claim 1, wherein the contact portion includes a first rib, a second rib adjacent to the first rib, a third rib arranged further outside of the first and second ribs in the sheet width direction, and a fourth rib adjacent to the third rib, wherein the plurality of openings includes a first opening between the first and second ribs, and a second opening between the third and fourth ribs, and wherein a width of the first opening in the sheet width direction is greater than a width of the second opening.

7. An image forming apparatus, comprising:

the static elimination apparatus according to claim 1; and an image forming unit including a transfer unit configured to transfer a toner image onto a sheet, and a fixing unit configured to heat and pressurize the sheet to which the toner image is transferred by the transfer unit to fix the toner image to the sheet, wherein the static elimination apparatus is arranged downstream of the image forming unit and eliminates static from the sheet on which an image has been formed by the image forming unit.

* * * * *